US006785947B2

(12) United States Patent
Downey et al.

(10) Patent No.: US 6,785,947 B2
(45) Date of Patent: Sep. 7, 2004

(54) METHOD OF PRODUCING A CORE BOARD PRODUCT

(75) Inventors: Curtis William Downey, Dothan, AL (US); Robert Lewis Wood, Dothan, AL (US); James Barton Ragan, Jr., Dothan, AL (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 10/387,462

(22) Filed: Mar. 14, 2003

(65) Prior Publication Data

US 2003/0172517 A1 Sep. 18, 2003

Related U.S. Application Data

(62) Division of application No. 09/880,079, filed on Jun. 14, 2001, now Pat. No. 6,601,291.

(51) Int. Cl.[7] .................................................. B23P 11/02

(52) U.S. Cl. .......................... 29/446; 29/401.1; 29/452; 72/367.1; 72/370.24

(58) Field of Search ..................... 29/446, 452, 525.01, 29/33 K, 33 P, 33 T, 282, 430, 512, 564, 564.1, 711, 712, 721, 722, 798, 401.1; 425/392, 394; 72/361.1, 367.1, 370.23, 374, 370.24

(56) References Cited

U.S. PATENT DOCUMENTS

| | | | | | |
|---|---|---|---|---|---|
| 910,684 | A | * | 1/1909 | Horner | 72/338 |
| 3,086,573 | A | | 4/1963 | Adams | |
| 3,451,120 | A | * | 6/1969 | Herzig et al. | 29/446 |
| 3,624,236 | A | | 11/1971 | Frappier | |
| 3,711,352 | A | | 1/1973 | Wagers et al. | |
| 3,745,633 | A | | 7/1973 | Langewis | |
| 3,768,949 | A | | 10/1973 | Upmeier | |
| 3,774,282 | A | | 11/1973 | Hooper | |
| 3,941,639 | A | | 3/1976 | Maroschak | |
| 4,223,851 | A | | 9/1980 | Lewallyn | |
| 4,261,784 | A | | 4/1981 | Saito | |
| 4,408,390 | A | * | 10/1983 | Fischell | 29/822 |
| 4,444,311 | A | | 4/1984 | Rias | |
| 4,595,093 | A | | 6/1986 | Eckstein | |
| 4,716,646 | A | | 1/1988 | Jarreby | |
| 4,886,167 | A | | 12/1989 | Dearwester | |
| 4,945,619 | A | | 8/1990 | Bayer | |
| 5,005,274 | A | | 4/1991 | Timell | |
| 5,014,422 | A | | 5/1991 | Wallis | |
| 5,027,582 | A | | 7/1991 | Dearwester | |
| 5,255,865 | A | | 10/1993 | Buell et al. | |
| 5,325,770 | A | | 7/1994 | Lukhard et al. | |
| 5,445,702 | A | | 8/1995 | Götz | |
| 5,845,871 | A | | 12/1998 | Lynch et al. | |
| 5,893,309 | A | | 4/1999 | Ast | |
| 5,945,132 | A | | 8/1999 | Sullivan et al. | |
| 6,119,330 | A | | 9/2000 | Cheng | |
| 6,249,968 | B1 | * | 6/2001 | Young | 29/890.047 |
| 6,325,953 | B1 | | 12/2001 | Murata | |
| 6,385,842 | B1 | * | 5/2002 | Davis, III | 29/740 |
| 6,547,230 | B2 | * | 4/2003 | Sato | 270/58.08 |
| 6,601,291 | B2 | * | 8/2003 | Downey et al. | 29/798 |

* cited by examiner

*Primary Examiner*—Essama Omgba
(74) *Attorney, Agent, or Firm*—Banner & Witcoff, Ltd

(57) ABSTRACT

A method of making core board product may be under the control of a processing unit. A first tubular core may be dispensed to a conveying portion to support the first tubular core at an interim location. The first tubular core may be conveyed to a flattening position under pressure of a compression member. The first tubular core is substantially compressed between the compression member and a flattening surface. The steps of dispensing, conveying, compressing may be repeated for at least a second tubular core. The second tubular is substantially compressing core against the first tubular core. The substantially compressed first tubular core and second tubular core may be fastened together in an abutting relationship with a plurality of fastening members so as to form the core board product.

17 Claims, 14 Drawing Sheets

METHOD OF PRODUCING A CORE BOARD PRODUCT

CROSS-REFERENCE TO RELATED APPLICATIONS

The present application is a divisional application of U.S. application Ser. No. 09/880,079 filed Jun. 14, 2001, now U.S. Pat. No. 6,601,291 which is hereby expressly incorporated by reference.

FIELD OF THE INVENTION

The present invention generally relates to a board made from cores, and more particularly to cores used to accommodate a roll of paper in manufacturing paper products.

BACKGROUND OF THE INVENTION

In producing commercial paper products, large paper rolls are shipped in locomotive rails cars to paper processing plants. In general, the center of the paper rolls contain a 10-foot long "elongated tubular core" made of liner paper much like a tube found in a toilet tissue roll or a tube in wrapping paper. In the large paper rolls, the typical tubular core is five inches in diameter having about a one-half inch wall thickness. The paper processing plants use the paper rolls as input material for processing machines that produce a variety of paper products for the residential and commercial markets. In processing, the paper is unwound from the elongated tubular core of the respective paper roll and the core is typically discarded in a landfill after use.

In the past, a core board machine included a pneumatic press in which tubular cores where flattened between two compression plates. Core board was produced by manually placing a core between a stationary plate and a movable plate, which extended towards the stationary plate to flatten the core. The movable plate retracted and one or two cores were manually placed between the plates and flattened against the first core. While the moveable plate was extended, an operator manually positioned a screw gun to fasten several screws into the compressed cores to hold them together. The machine was labor intensive, had limited ability to produce a large quantity of core board product, and was expensive to manufacture.

Core board has been used as a packing material to protect large paper rolls from damage during transport in rail cars. However, there is a risk that the pointed end of the screws may protrude through the compressed cores and tear the paper rolls during shipment in the rail cars. Further, the screws can have a reduced fastening performance by loosening overtime. Accordingly, there was a need to prevent separation of the compressed cores so that the performance was consistent for the purpose of a packing material. Since the search is always on for improved products and lower costs, there is a particular need for an apparatus and a method of producing an improved core board product.

BRIEF SUMMARY OF THE INVENTION

Briefly, the present invention improves the art by providing an advanced core board forming apparatus, a method of making core board product and a core board product.

According to one aspect of the invention, a core board forming apparatus includes a feeding apparatus having a discharge portion for discharging a tubular core. A compression apparatus has a compression surface and a flattening surface movable together to flatten the tubular core. A conveying portion supports the tubular core at an interim location between the compression surface and the flattening surface in an uncompressed condition and releases the tubular core to the flattening surface when the compression surface and flattening surface move together to a closed position. A controller unit is configured to control the feeding apparatus and the compression apparatus. In this way, tubular cores are positioned by the conveying portion to substantially align and form a consistent core board product.

In a second aspect of the invention, a dispensing apparatus includes a device for detecting tubular cores at a predetermined dispensing position for sequentially dispensing each of the cores. A compression apparatus has a compression member for substantially flattening each of the dispensed tubular cores and a plurality of pivotable members configured to retain each of the dispensed cores below the compression member for conveyance to a flattening plate upon downward contact with the compression member. A processor unit is configured to execute computer readable code for controlling the dispensing apparatus and the compression apparatus.

In a third aspect of the invention, a method of making core board product is under the control of a processing unit. A first tubular core is dispensed to a conveying portion to support the first tubular core at an interim location. The first tubular core is conveyed to a flattening position under pressure of a compression member. The first tubular core is substantially compressed between the compression member and a flattening surface. The steps of dispensing, conveying, compressing is repeated for at least a second tubular core. The second tubular is substantially compressing core against the first tubular core. Then the substantially compressed first tubular core and second tubular core are fastened together in an abutting relationship with a plurality of fastening members so as to form the core board product.

A first tubular core is dispensed to a conveying portion above a compression surface. The first tubular core is conveyed under downward pressure to the compression surface after detecting the presence of the first tubular core on the conveying portion. The first tubular core is substantially compressed on the compression surface. The steps of dispensing, conveying, compressing is preformed for at least a second tubular core in which during the step of compressing the compressed first tubular core and second tubular core are fastened with a plurality of fastening members so as to form the core board product.

In a fourth aspect of the invention, a core board product includes at least two substantially flattened tubular paper cores fastened together by a plurality of fastening members, the fastening members each has a first fastening portion contacting against only one of flattened cores and two second fastening portions extending through the flattened cores substantially perpendicular to the first fastening portion. In this way, the core board product prevents tearing abutting paper rolls during transportation.

BRIEF DESCRIPTION OF THE DRAWINGS

The foregoing summary of the invention as well as the following detailed description of the invention considered in conjunction with the accompanying drawings provides a better understanding of the invention, in which like reference numbers refer to like elements, and wherein.

DETAILED DESCRIPTION OF THE INVENTION

Figure 1:
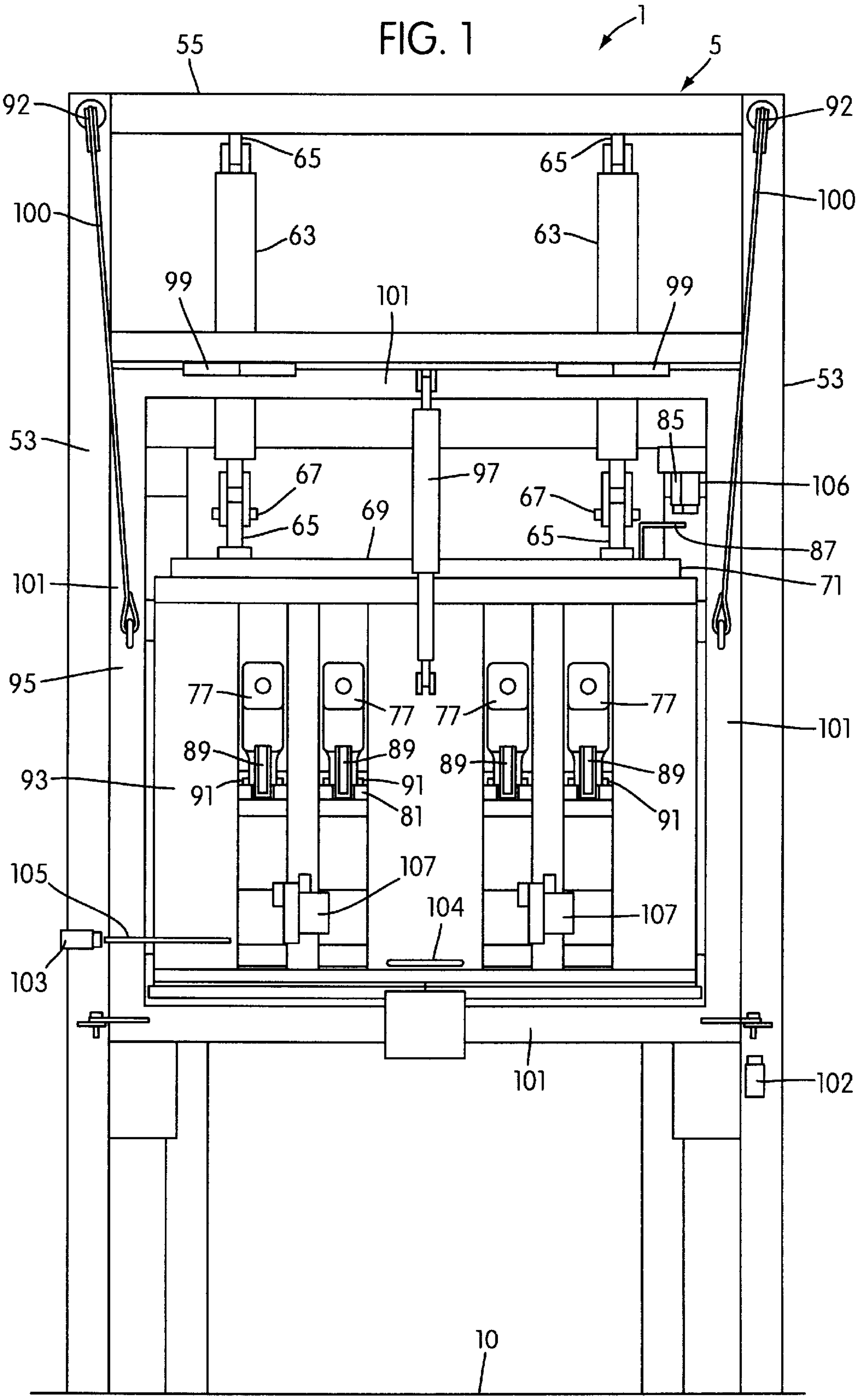
FIG. 1 is a schematic front elevational view of an apparatus for forming core board product according to the teachings of the present invention.

FIGS. 1–12A, 12B, and 13 illustrate an embodiment of a core board forming apparatus 1 and a method of producing a core board product 7 according to the teachings of the present invention. Apparatus 1 comprises a dispensing section 3 for holding and discharging a plurality of tubular cores 13. A core compression section 5 receives the tubular cores so as to flatten and secure the cores to form the core board product 7 shown in FIG. 11. A microprocessor controller unit 9, shown in FIG. 6, controls the operation of dispensing section 3 and core compression section 5. The details of apparatus 1 are described in detail below.

Figure 3:
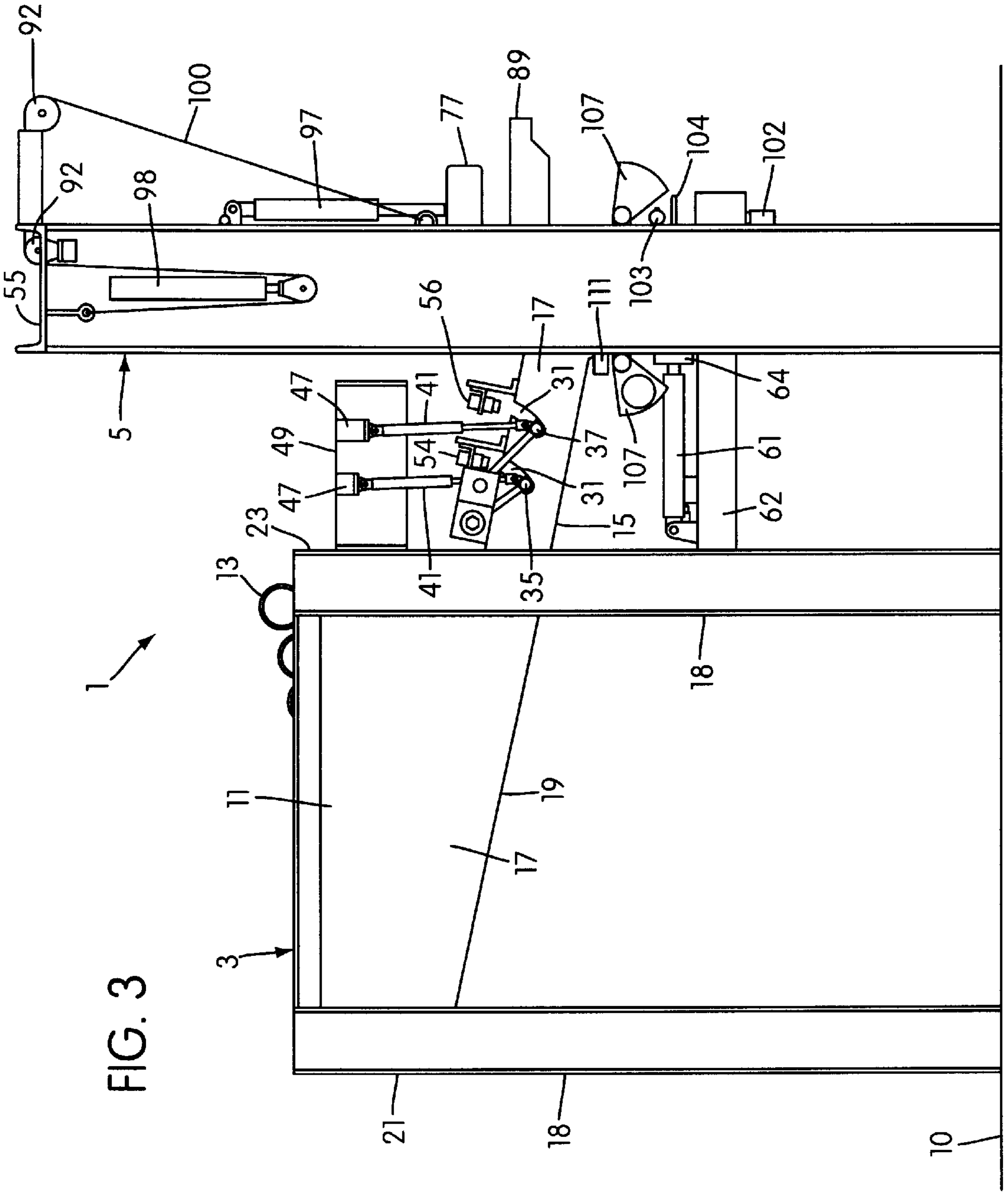
FIG. 3 is a schematic side elevational view of the apparatus of FIG. 1 according to the teachings of the present invention.
Figure 5:
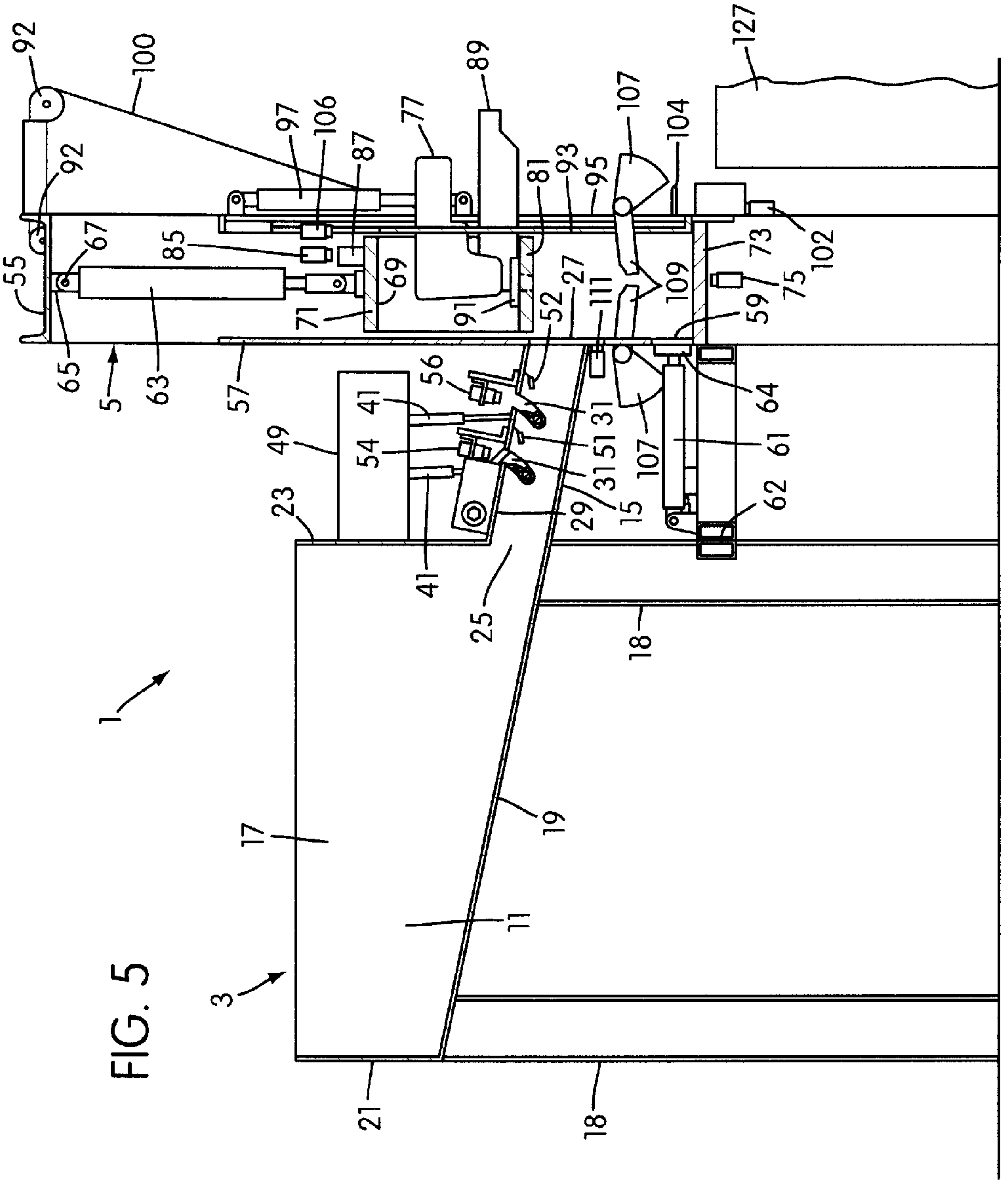
FIG. 5 is a side sectional view of the apparatus of FIG. 1.

As illustrated in FIGS. 3 and 5, dispensing section 3 includes a holding portion 11 for temporarily storing cores 13. A discharge chute 15 is mounted in front of holding portion 11 so that the cores are sequentially conveyed into compression section 5 under control of controller unit 9. In a preferred embodiment, holding portion 11 of dispensing section 3 is constructed from parallel sidewall plates 17 mounted on opposing sides of a downwardly inclined floor plate 19. Vertical supports 18 are mounted to sidewall plates 17 to support dispensing section above a floor surface 10. Referring to FIG. 5, inclined floor plate 19 is angled approximately 15 degrees from the horizontal so that cores 13 can roll forward by gravity from holding portion 11 into the discharge chute 15. The angle of the inclined floor plate is preferably set in a range from 15 degrees to 25 degrees but other inclination angles are possible. As illustrated in FIG. 5, a rear wall plate 21 is fastened to the rear end of sidewall plates 17 and inclined floor plate 19. A front wall plate 23 spans between the front portions of sidewall plates 17 such that a rearward opening 25 of discharge chute 15 is formed between a bottom edge of front wall plate 23 and inclined floor plate 19. It should be recognized that there are a number of approaches and other constructions of the holding portion that enable storage and movement of cores to discharge chute 15.

Figure 4:
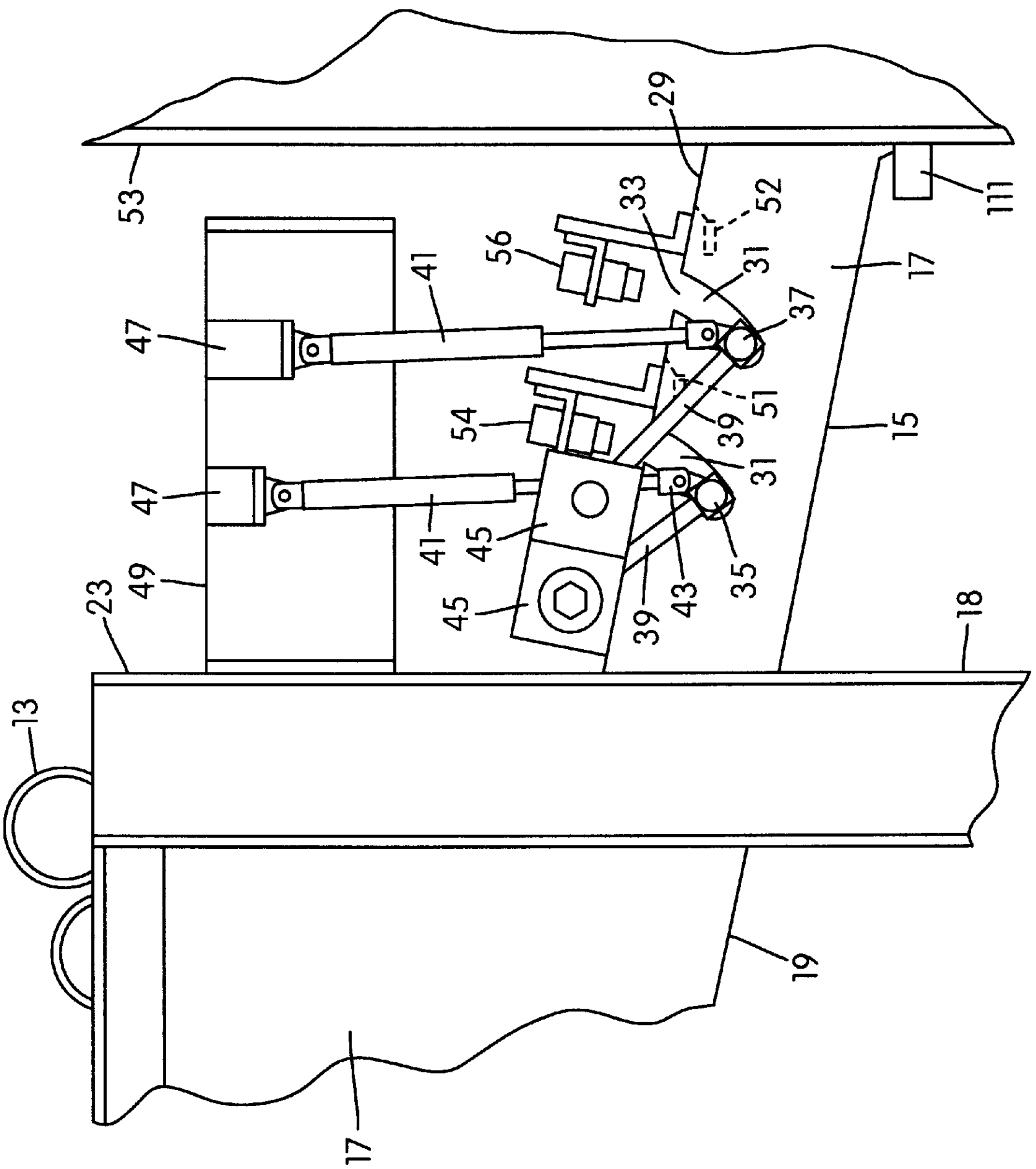
FIG. 4 is an enlarged fragmentary side view of a discharging portion of the apparatus shown in FIG. 1.

With reference to FIGS. 3–5, in a preferred embodiment, discharge chute 15 has a substantially enclosed shape having rearward opening 25 and a forward discharge opening 27. An elongated portion of each sidewall plate 17 is vertically mounted to the opposite of sides of inclined floor plate 19 to form discharge chute 15. As shown in FIG. 5, a top plate 29 is affixed to a top edge of the elongated portion of each sidewall plate 17 to enclose discharge chute 15. The rear end of top plate 29 is affixed to front wall 23 at the bottom edge of front wall plate 23. In one embodiment, as seen in FIGS. 3 and 4, aligned curved slots 31 are cut into the opposing sidewall plates 17 of the elongated portion. Top plate 29 includes corresponding horizontally aligned slot openings 33 extending between curved slots 31.

In a preferred embodiment, as best seen in FIG. 4, curved slots 31 enable a first movable rod 35 and a second movable rod 37 to rotate upwardly so that the core can roll past each rod as requested by controller unit 9. Likewise, movable rods 35, 37 rotate downwardly to prevent the cores from rolling into compression section 5. Each end of movable rods 35, 37 extends through a hole in a lower end of a pivot member 39. Likewise, the lower end of a pneumatic actuator 41 is pivotally mounted to the lower end of pivot member 39 via a pivot pin 43. Pivot member 39 is constructed from a flat bar having holes that retain the pivot pin and the ends of movable rods 35, 37. The upper end of pivot member 39 is pivotally mounted to a bracket 45 that is affixed to top plate 29 of discharge chute 15. An upper end of each pneumatic actuator 41 is pivotally fastened to a support bracket 47 is that affixed to cantilevered support plate 49. Each cantilevered support plate 49 is substantially aligned with sidewall plates 19 and is affixed to front wall 23 to provide a structure for the supporting actuators 41 with support bracket 47.

With reference to FIG. 4, in a preferred embodiment, core position sensors 51, 52 are mounted underneath top plate 29 of discharge chute 15 so that a core abutted against each movable rod 35, 37 can be detected. Each position sensor 51, 52 is disposed such that a beam of light is directed just upstream of movable rods 35, 37 to detect the presence of a core. In essence, position sensors 51, 52 look upstream of the rods to see when a core is disposed against rods 35, 37 so that a single core can be sequentially discharged into compression section 5; however, sensors 51, 52 also sense the absence of a core against the rods.

In an embodiment of the invention, core position sensors 51, 52 are a photoelectric sensor that detects an object; however, other type of sensors may be used, including contact sensors or capacitive sensors. Core position sensors 51, 52 are operatively coupled to microprocessor controller unit 9 by interface control hardware, such as wires or wireless connections. This enables controller unit 9 to receive and process a detection signal generated by position sensors 51, 52. Referring to FIGS. 3, 4 and 5, in one arrangement, rod position sensors 54, 56 may be mounted to top plate 29 to detect when rods 35, 37 are in the up position. Sensors 54, 56 are preferably proximity sensors that detect a magnetic field, but other types sensing devices that detect the presence of the rods in the up position are contemplated, such as photoelectric sensors, capacitive sensors, or limit switches. In an embodiment, the detection of the up position of rods 35, 37 can be accomplished with encoders configured to sense the rotary motion of pivot member 39. While discharge chute 15 is shown and described, other arrangements that sequentially dispense cores are possible, such as a rotating paddle wheel type.

Figure 2:
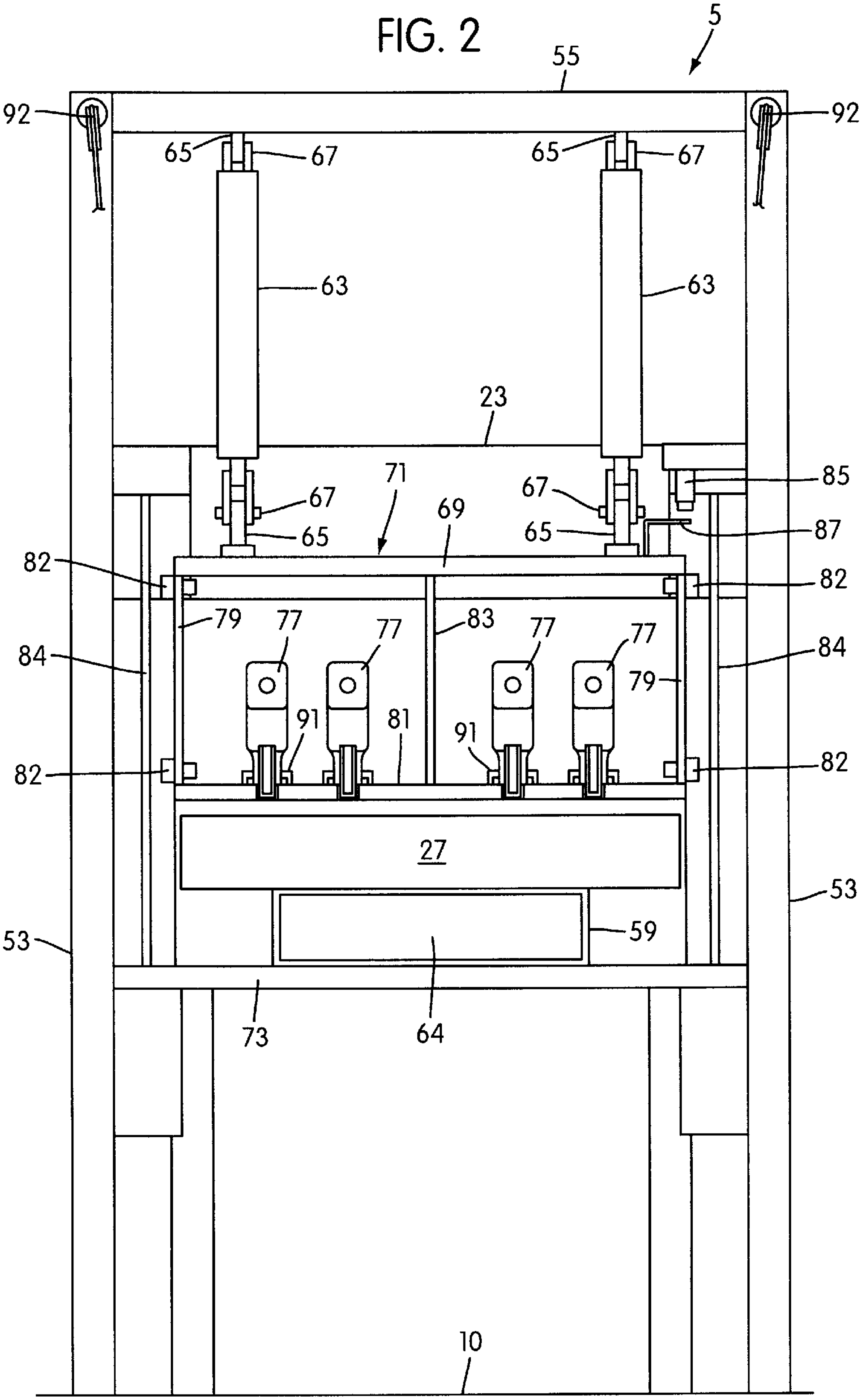
FIG. 2 is a schematic front elevational view of the apparatus of FIG. 1 with a front portion removed to reveal components inside of the apparatus.

Referring to FIGS. 1 and 2, in an embodiment, compression section 5 preferably includes a rectangular frame formed by two spaced vertical channel members 53 and a horizontal channel member 55 affixed to the top end of each vertical channel member 53. As seen in FIGS. 2 and 5, a back plate 57 is mounted between vertical channel members 53. Back plate 57 includes an opening adapted to mate with the corresponding discharge opening 27 of discharge chute 15. The lower end of back plate 57 includes a notch opening 59 enabling an unload ram 61 to discharge the core board product from compression section 5.

Figure 13:
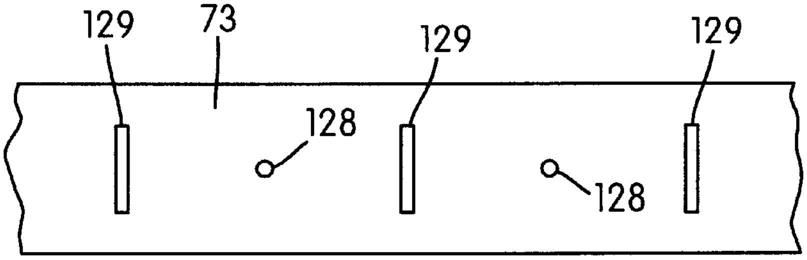
FIG. 13 is a fragmentary schematic top plan view of a bottom portion of the apparatus of FIG. 1 illustrating grooves and openings for control devices.

Referring to FIGS. 1, 2, and 5, in a preferred embodiment, compression section 5 includes a press assembly 71 that compresses or flattens a dispensed core against a bottom plate 73. Bottom plate 73 is mounted between vertical channel members 53. Referring to FIGS. 5 and 13, bottom plate 73 includes two openings 128 for two optical sensors 75 to detect the presence or absence of a dispensed core on the plate, in which a beam of light is directed vertically into the openings from the sensors. Sensors 75 are operatively coupled to controller unit 9. The use of the detection signal from optical sensors 75 will be described with the operation sequence of core board forming apparatus 1. It is recognized that other types of sensing devices, such as contact or capacitive sensors may be used, instead of optical sensors 75 to detect a core on the bottom plate.

As best seen in FIG. 2, in a preferred embodiment, press assembly 71 is constructed from a top support member 69, vertical plates 79, and a compression plate 81. Vertical plates 79 serve to physically connect top support member 69 and compression plate 81 into a single structure. Accordingly, vertical plates 79 are mounted on opposing sides of the top support member and the compression plate. A vertical stiffener plate 83 is mounted between the midpoint the opposing sides of top support member 69 and compression plate 81 to provide enhanced structural support.

Bearings 82 are mounted to the side of vertical plates 79 so that press assembly 71 travels freely against vertical bearing plates 84 inside of vertical channel members 53. Bearing 82 are preferably cam follower types, but may also be roller bearing types. Vertical bearing plates 84 are spaced inward from channel members 53. Referring to FIGS. 1, 2 and 5, hydraulic actuators 63 vertically move press assembly 71 in compression section 5. The upper ends of actuators 63 are pivotally mounted to the bottom surface of horizontal channel member 55 by attachment tangs 65 and pivot pins 67. Likewise, the lower ends of hydraulic actuators 55 are pivotally mounted to top support member 69 of press assembly 71 by attachment tangs 65 and pivot pins 67. In an alternative embodiment, the press assembly can be motor driven and configured with gears to move.

As best seen in FIGS. 1, 2, and 5, a press position sensor 85 is mounted on the inner surface of vertical channel member 53 to detect when press assembly 71 is in a full up position. Press position sensor 85 generates a detection signal when a magnetic field is created between a metal bar 87 that is mounted to the upper surface of top support member 69; however, other types of sensors may be used for detection, such as limit switches. Similarly as other sensors of apparatus 1, press position sensor 85 is operatively coupled to microprocessor controller unit 9.

As best shown in FIG. 2, in a preferred embodiment, press assembly 71 also securely fastens at least two flattened cores together by fastening devices, such as pneumatic staple guns 77. Staple guns 77 are commercially available and include a staple feeder cartridge 89. Referring to FIGS. 1, 2, and 4, compression plate 81 includes the plurality of staples guns 77 for fastening the flattened cores together against bottom plate 73. Staple guns 77 are mounted to the upper surface of the compression plate 81 via brackets 91. Brackets 91 are mounted such that staple guns 77 are secured during vertical movement of press assembly 71, but can slide out of bracket 91 for maintenance. Notch openings are included in compression plate 81 so that staple guns 77 can inject staple fasteners into the flattened cores.

As best seen in FIG. 1, in a preferred embodiment, compression section 5 includes a discharge gate 93 mounted inside of a maintenance gate 95. More fully shown in FIG. 10, discharge gate 93 opens vertically to a predetermined height so that core board product 7 can be discharged from bottom plate 73 by unload ram 61 during the manufacturing operation. Maintenance gate 95 provides an arrangement for gaining access to press assembly 71 and staple guns 77 for maintenance or other purposes. Regarding discharge gate 93, a pneumatic actuator 97 moves gate 93 up vertically.

As seen in FIG. 1, maintenance gate 95 comprises interconnected horizontal and vertical angle members 101 forming a rectangular frame that resides inside of the vertical channel members 53. Maintenance gate 95 pivots about hinges 99 and discharge gate 93 rotates with gate 95. Referring to FIG. 3, maintenance gate 95 is capable of being pivoted open by a pneumatic actuator 98 mounted to vertical channel member 53. In use, a rod of actuator 98 pushes down on a wire 100 fed through pulleys 92 and lifts gate 95 to pivot about hinges 99. As seen in FIG. 1, a handle 104 is provided to enable lifting of gate 95. In addition, a gate proximity sensor 102 is mounted in the front of vertical channel member 53 to detect when gate 95 is closed. Again, other types of sensing devices can be used to detect when gate is closed, such as contact switches.

As shown in FIG. 1, discharge gate 93 is preferably slotted to enable vertical movement of staple guns 77 with press assembly 71. A discharge gate proximity sensor 103 is mounted to the lower front of vertical channel member 53 to detect when discharge gate 93 is closed. A second discharge gate proximity sensor 106 detects when gate 93 is in the opened position. Sensor 106 is mounted near press position sensor 85 on vertical channel member 53. Sensor 103 generates a detection signal when a magnetic field is created between a metal bar 105 that is mounted the lower front of discharge gate 93. Likewise sensor 106 detects a magnetic field created by the upper part of discharge gate 93. Controller unit 9 receives the detection signal preferably by control wires or, if desired, the detection signal may be transmitted by wireless communication connections. It should be recognized that alternative types of sensing devices that serve the same purposes as sensors 103 and 106 may be used.

Referring to FIGS. 1, 3 and 5, in a preferred embodiment, compression section 5 further preferably includes a conveying portion formed by rotatable arms or fingers 107. A front set of rotatable arms 107 is pivotally mounted to discharge gate 93 and a rear set of arms 107 is mounted to back plate 57. As shown in FIG. 5, the front set of arms 107 and the rear set of arms 107 form a valley type structure such that both sets of arms are sloped towards each other. This enables a dispensed core to roll on the arms and to be centered above bottom plate 73 of compression section 5.

As illustrated in FIG. 5, each of rotatable arms 107 has an inclined elongated member 109 including a concave portion at the tip or receiving end to retain a core lengthwise between the front set and rear set of arm 107. The members 109 contact the outer surface of the tubular core at discrete locations for conveyance to bottom plate 73. The opposite end of rotatable arms 107 is counterweighted to enable each arm to pivot upwardly to a holding or position as shown. In sum, the conveying portion supports a dispensed tubular core at an interim location between compression plate 81 and bottom plate 73 in an open uncompressed condition so that the core can be place at a predetermined position on bottom plate 73. The conveying portion also enables a core to be aligned on top a first compressed core for subsequent compression are fastening operations.

An optical sensor 111 is affixed underneath discharge chute 15 such that a substantially horizontal beam of light senses the presence or the absence of a dispensed core retained between the front and rear set of rotatable arms 107. While an optical sensor is shown, a capacitive sensor may be also be used. Other constructions of the conveying portion are possible.

Referring to FIG. 5, core board forming apparatus 1 further includes an unload ram 61 for removing finished core board product 7 from compression section 5. In a preferred embodiment, unload ram 61 includes a pneumatic cylinder with a rod having a pushing bar 64 configured to push the core board product. Unload ram 61 includes a proximity sensor that detects when it is retracted. The unload ram is horizontally mounted on beam supports 62 that are fastened to support members 18 and vertical channel members 53.

Advantageously, microprocessor controller unit 9 may comprise a computing device for controlling operation core board forming apparatus 1. In one embodiment of the invention, controller unit 9 comprises a central programmable logic control unit (PLC) or a series of independent central programmable logic control units configured for providing semi-automatic or automatic processing operation. Likewise, controller unit 9 may be a general purpose computer configured to operate with such programmable controllers. Nevertheless, the operational logic sequences for controlling core board apparatus 1 can be readily programmed by those having ordinary skill in the art.

Figure 6:
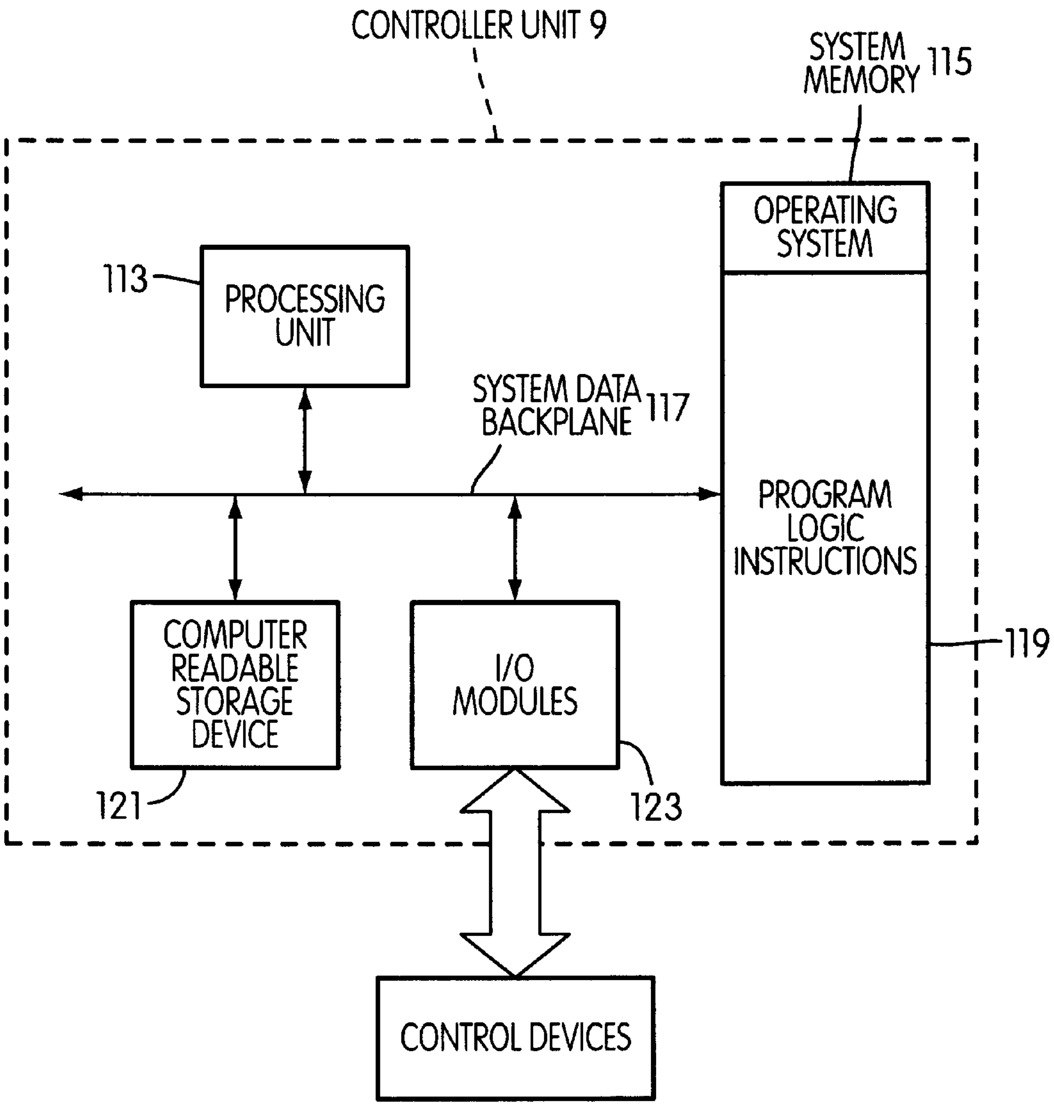
FIG. 6 is a schematic diagram of a controller unit of the apparatus of FIG. 1.

As shown schematically in FIG. 6, in a preferred embodiment of the invention, controller unit 9 comprises a PLC-5 series programmable controller including 1771 series digital and analog input/output modules commercially available through the Allen-Bradley Company of Milwaukee, Wis.; however, other suitable equipment or devices may be used for the controller unit. Hardware components of microprocessor controller unit 9 may include a processing unit 113, a system memory 115, and a system backplane 117 that forms a data pathway for input/output modules 123. Input/output modules 123 interface with various control devices, such as the sensing devices, comprising apparatus 1. Processing unit 113 may be any suitable microprocessor used in industrial control systems. The system backplane 117 may be any of several types of conventional backplane structures. System memory 115 includes computer readable code in the form of read only memory (ROM) and random access memory (RAM). System memory 115 stores programmable instructions of the operational logic sequences 119 that are executed by processing unit 113.

If desired, controller unit 9 can further include a computer readable storage device 121 that may comprise an Eraseable Programmable Read Only Memory (EPROM) to store data. Storage device 121 and associated computer-readable media provide nonvolatile storage of computer readable code and logic sequences. Controller unit 9 may operate in a networked environment (not shown) using a network connection in input/output modules 123. The networked environment may include a local area network (LAN) any number of networking signaling used in industrial control systems, such as Ethernet, Controlnet, Devicenet, or Datahighway plus.

It should be recognized by one of ordinary skill in the art that a hydraulic system is used for moving the hydraulic actuators in compression section 5. Such a hydraulic system includes a tank, a pump, pipes, hoses and control values. It should be apparent that pneumatic or air operated components described are interconnected to a pneumatic system in which the intended function of the component is controlled by microprocessor controller unit 9 via an air control valve (not shown). The control valve includes a solenoid that opens and closes according to an electrical signal transmitted by the controller unit. Such a pneumatic system includes an air compressor, filters, hoses, pipes, and regulators. In addition, the pump motor and air compressor motor may be interlocked with microprocessor controller unit 9 via contact relays (not shown) to provide electric power for operation. Other constructions of the hydraulic and pneumatic system are possible.

FIGS. 7–10 illustrate a functional overview of a method of making core board product in accordance with the present invention, as carried out by core board forming apparatus 1. An operational cycle is herein defined as compression and securing of at least two cores together; however more cores may be used. For ease of explanation, use of the term “cores” denotes a generic tubular paper core without reference to the length. One arrangement, the elongated tubular cores can be cut into smaller core section. This enables the core board product have different lengths as a packing material or other purposes.

Figure 7:
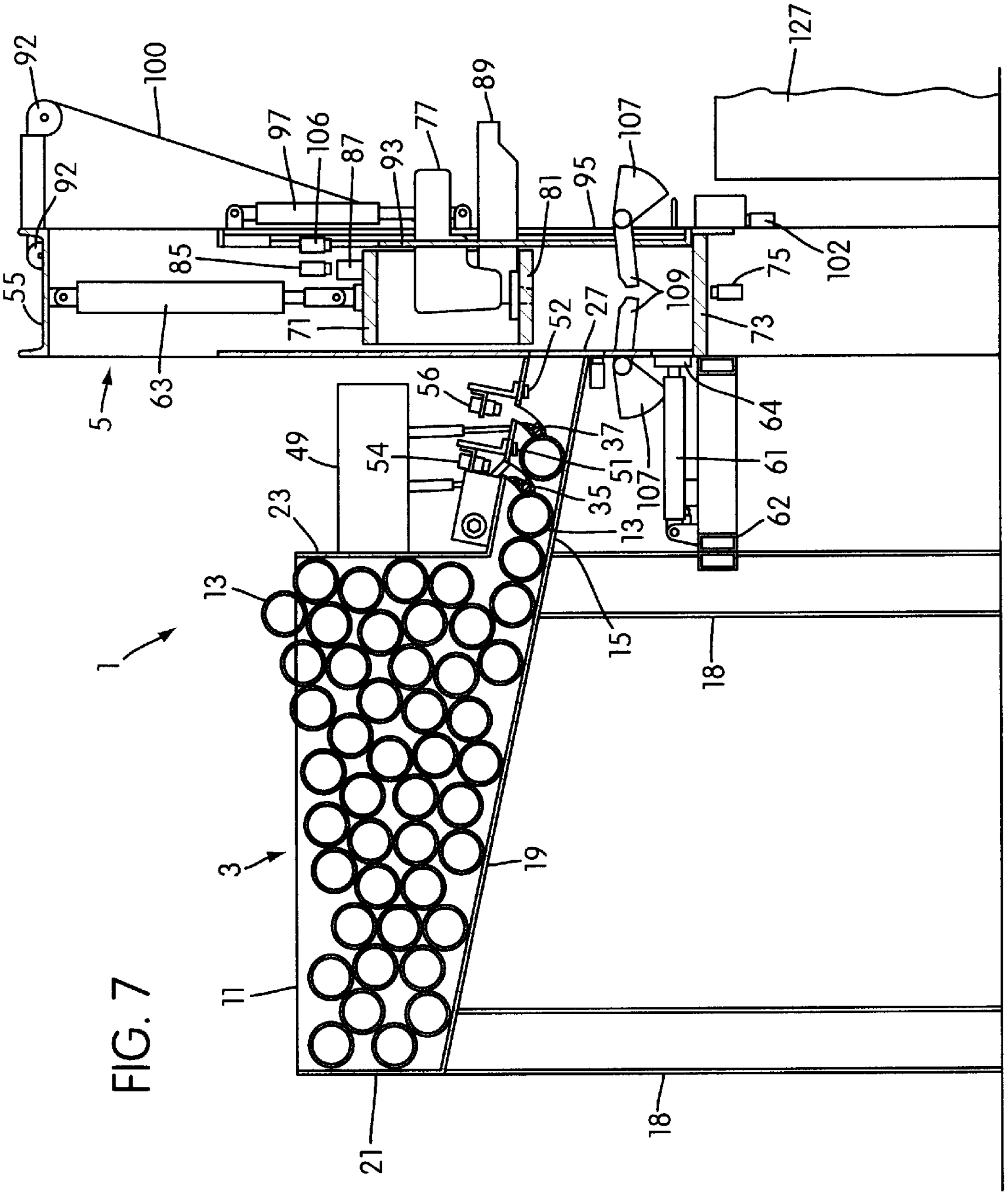
FIGS. 7–10 are side sectional views of the apparatus of FIG. 1 illustrating a functional sequence according to the teachings of the present invention.

An embodiment of the dispensing or discharging sequence of dispensing section 3 is described below. Referring to FIG. 7, cores 13 have been placed in holding portion 11 of dispensing section 3. At discharge chute 15, first and second moveable rods 35, 37, respectively, are in a closed position to block the cores from freely rolling into the compression section. In use, the cores at the bottom of dispensing section 5 roll forward on incline floor plate 19 towards discharge chute 15 and a core abuts against the first moveable rod 35. At this position, upstream core position sensor 51 detects the presence of a core in a first discharge position.

Still referring to FIG. 7, upon detection of the core in the first position, a detection signal is processed by microprocessor unit 9 to actuate a control valve (not shown) that operates pneumatic actuators 41 connected to first moveable rod 35. The lowered end of actuator 41 lifts upward to impart an upward rotation of pivot member 39 and first movable rod 35. The first movable rod follows the curvature of the curved slots 31 in discharge chute 15. Eventually, first movable rod 35 rotates upward just enough to enable the core to roll under the rod. In this point, the presence of the core is detected by downstream core position sensor 52. In one arrangement, an alert condition indicates that the core might be misaligned in discharge chute 15. The alert condition is programmed to activate when rod 35 is detected in the up position by rod position sensor 54 and the absence of a core is detected by core position sensor 52.

In a preferred embodiment, a second discharge position is defined when a core in disposed between the first and second moveable rods. In the second discharge position and after a short time delay, such as 1.5 seconds, the first movable rod is rotated back down into the closed position. Second movable rod 37 is rotated upward by its pneumatic actuators 41 to allow the core to roll under the rod when it receives a core request signal from microprocessor controller unit 9. Advantageously, sensors 51, 52 detect the tubular core at predetermined first and second dispensing positions to ensure sequentially discharging the cores.

An embodiment of the operation of the compression section is described below. In a preferred embodiment, a first core request signal is generated at the start of the operational cycle in which the microprocessor unit scans the sensors 75, 85, 102, 103, 111 so that compression section 5 is ready to accept a core. For example, optical sensors 75 at bottom plate 73 detects that there is the absence of a core in compression section 5. Press assembly 71 is detected in the full up position. Maintenance gate 93 and discharge gate 95 are detected as closed. Optical sensors 111 detect absence of a core on arms 107.

Figure 8:
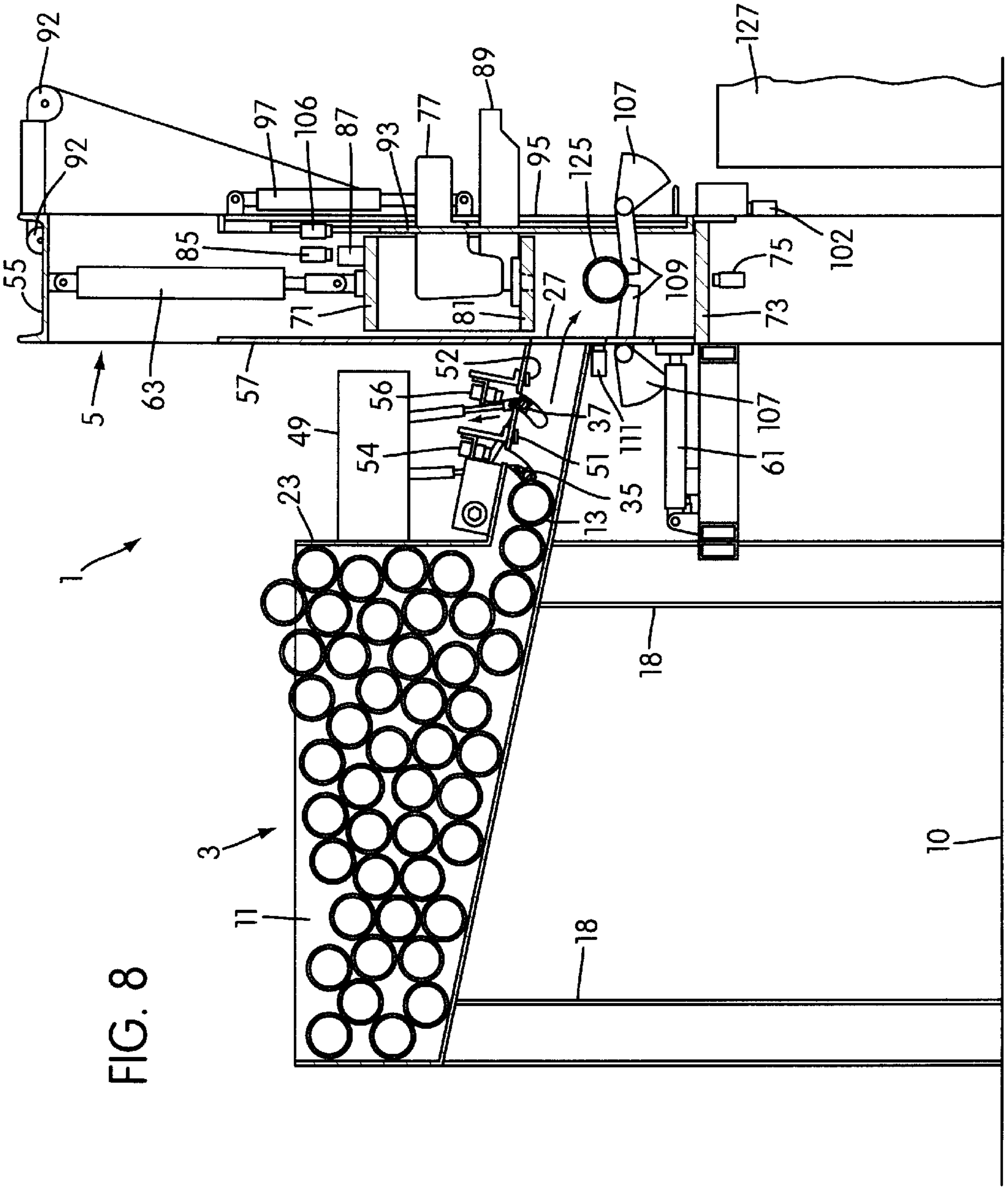

As shown in FIG. 8, the first core request signal has been generated and a dispensed core 125 has been conveyed from dispensing section 3 on to the conveying portion formed by rotatable arms 107. In this point in the operational sequence, optical sensor 111 detects the presence of the dispensed core on arms 107. In one arrangement, an alert condition is programmed to activate when rod 37 is detected in the up position by rod position sensor 56 and the absence of a core is detected by optical sensor 111.

Figure 9:
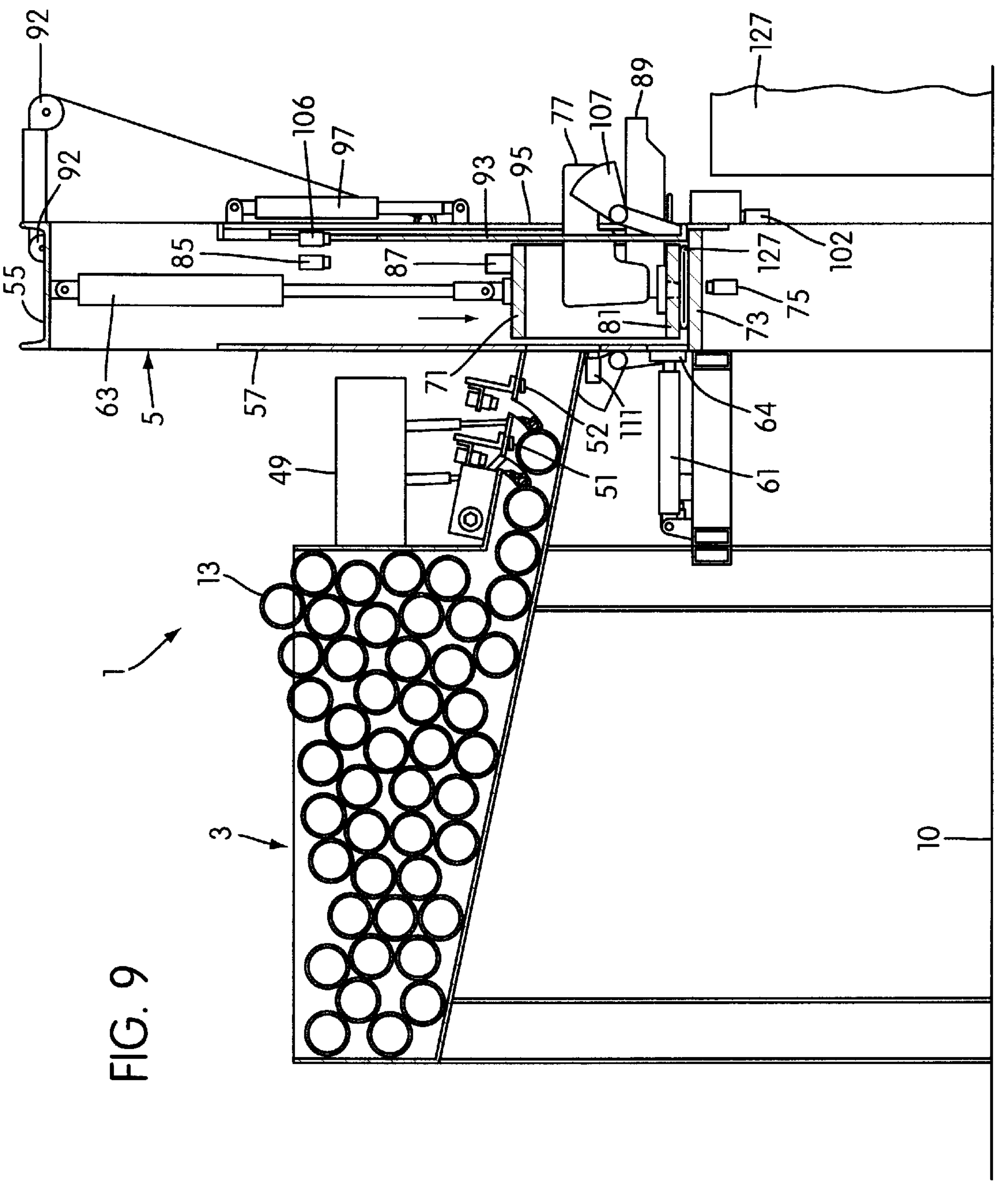

As shown in FIG. 9, upon detection of the dispensed core 125, a detection signal is processed by microprocessor unit 9 to actuate a control valve (not shown) for operating hydraulic actuators 63 connected to press assembly 71. Accordingly, press assembly 71 moves in a downward stroke towards dispensed core 125. Press assembly 71 comes in contact with dispensed core 125. As a downward motion of compression plate 81 pushes on dispensed core 125, arms 107 rotate downwardly so that core 125 is guided and centered on bottom plate 73 of the compression section. At the end of the downward stroke, arms 107 release the dispensed core 125 and the core is compressed against bottom plate 73 by compression plate 81.

Press assembly 71 then returns to the full up position in an upward stroke, in which rotatable arms 107 rotate back to the holding position ready to accept a second core for flattening. Press position sensor 85 detects the presence of press assembly 71 in the full up position, in which controller unit 9 counts the number of downward strokes in the operational cycle. If desired, by counting the number of downward strokes more cores can be dispensed and flattened by compression section 5 to form a single core board product. In the illustrated arrangement, two downward strokes are used in the operational cycle.

Figure 10:
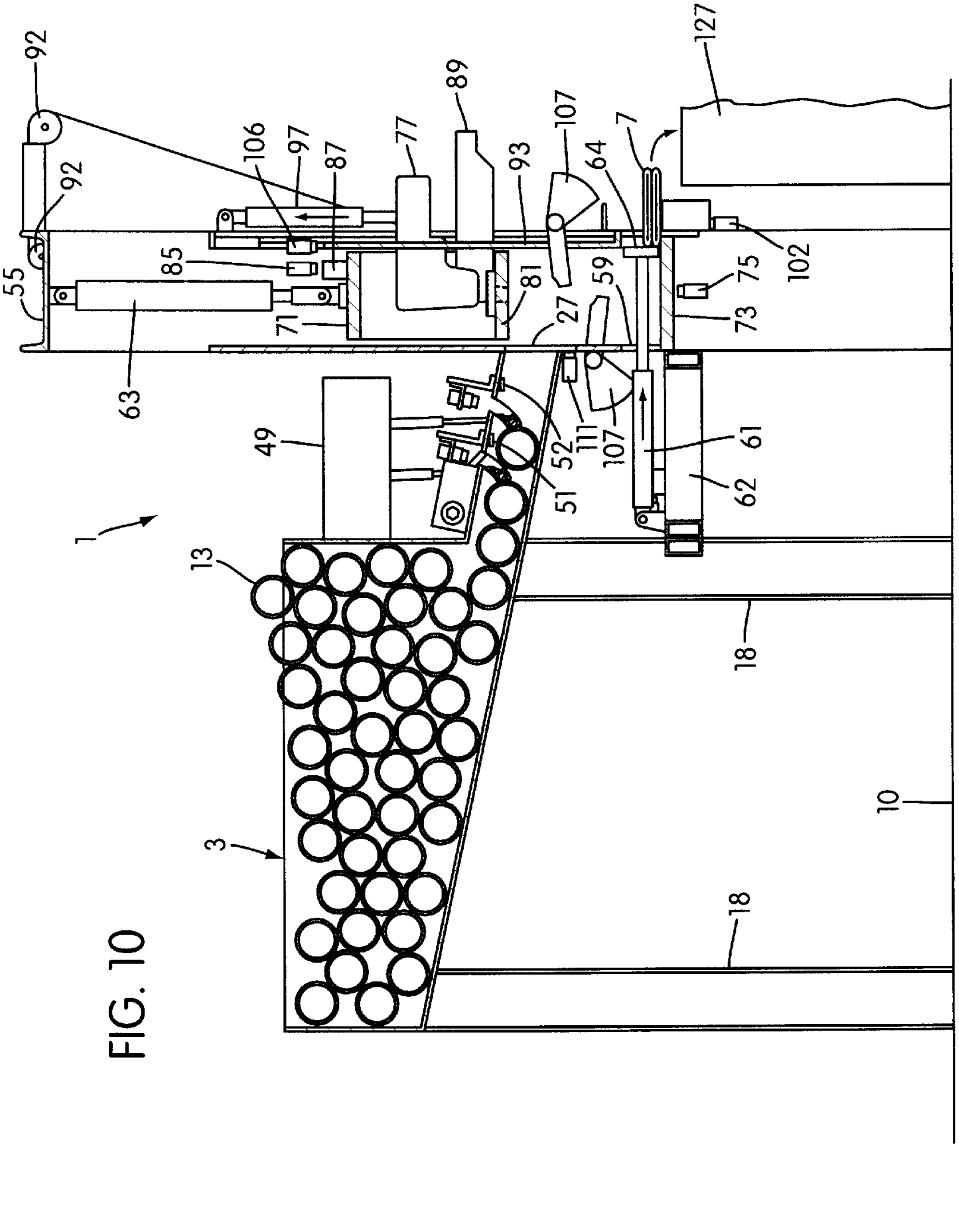

Similarly as shown in FIG. 8, after detection of press assembly 71 by sensor 85, a second core request signal is generated so that second movable rod 37 opens to permit a second core to rest on rotatable arms 107 similarly as dispensed core 125. As shown in FIG. 10, the second core is then compressed against the flattened first dispensed core 125. Microprocessor controller unit 9 determines that a second downward stroke has occurred so that in the extended position of the second downward stroke, the compressed cores are stapled together by staple guns 77 against bottom plate 73. Following fastening of the compressed cores, discharge gate 93 is opened vertically by pneumatic actuator 97 in which gate sensor 106 detects the predetermined opening to stop movement of the gate 93. Core board product 7 is then ejected by unload ram 61 by pushing bar 64 into a retaining bin 127.

Figure 11:
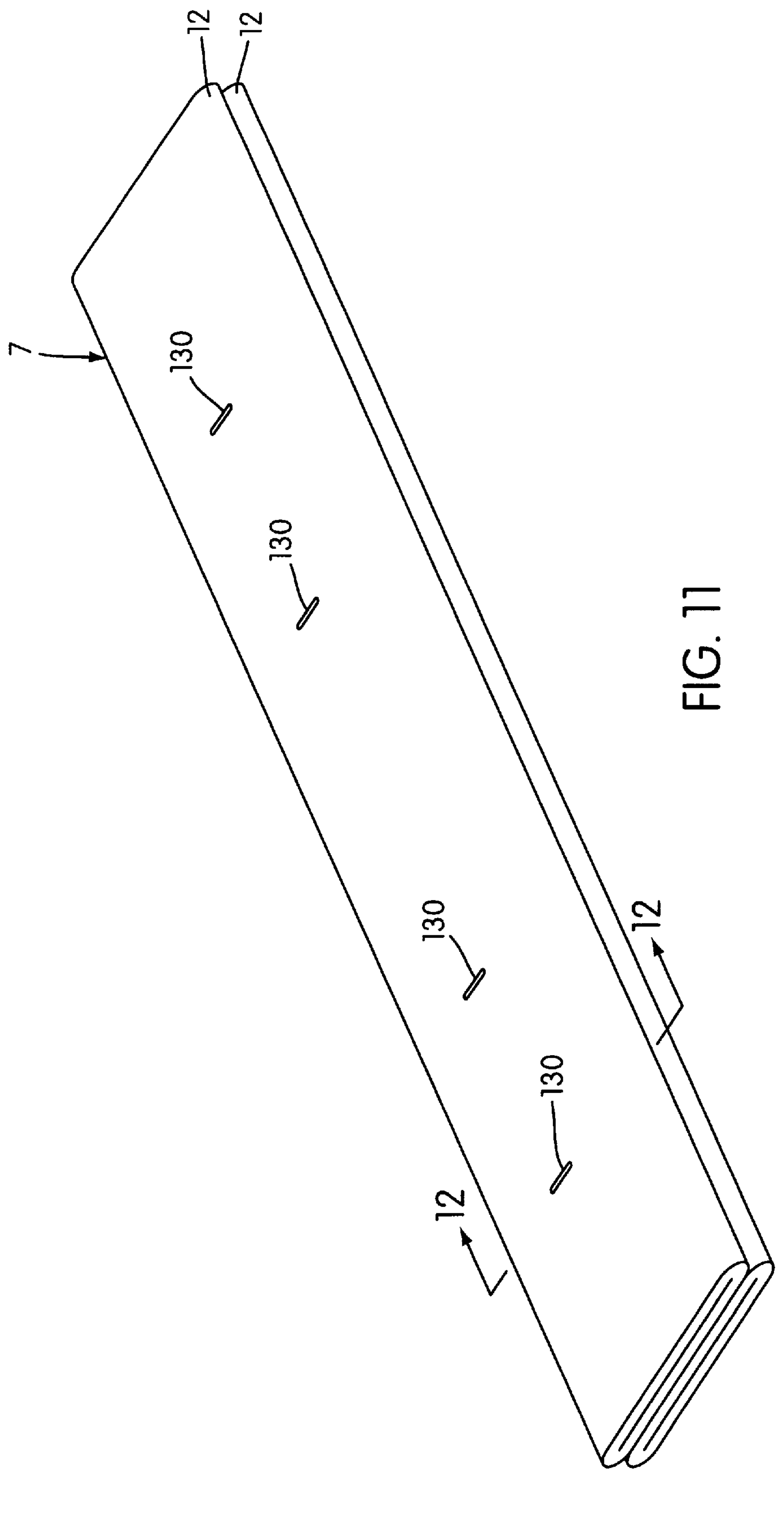
FIG. 11 is a schematic perspective view of an embodiment of a core board product according to the teachings of the present invention.
Figure 12A:
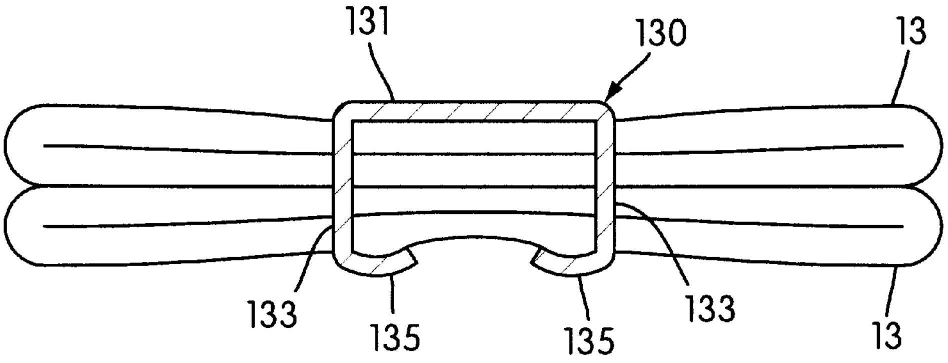
FIGS. 12A and 12B are schematic sectional views of alternative fastening arrangements of the core board product shown in FIG. 11 taken along line 12—12.
Figure 12B:
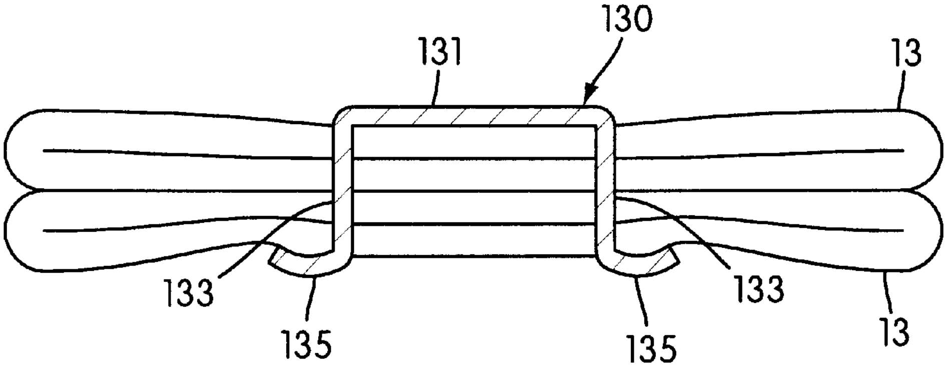

After the method, as illustrated in FIGS. 11, 12A and 12B, a core board product 7 comprises at least two substantially flattened tubular paper cores 12 fastened together in an abutting relationship by a plurality of integral fastening members 130. Fastening members 130 are preferably located at discrete predetermined locations on the flattened cores 12. Fastening members 130 can have any number of orientations and directions on the tubular cores.

As shown in FIGS. 12A and 12B, in alternative embodiments, integral fastening members 130 have a first fastening portion 131 abutting one of the flattened cores, two substantially perpendicular fastening portions 133 extending through each of the flattened cores. Winged portions 135 abut the flattened tubular core opposite of the tubular core abutted by first fastening portion. 131. As shown in FIG. 13, in an embodiment, grooves 129 located on bottom plate 73 are generally aligned with staple guns 77 to bend over the fastening member to form the winged portions 135. The grooves have a configuration like conventional stapler backing plates to bend over the ends of staples. A strong board product is formed by resisting a springing effect of the substantially flatten cores. The springing effect occurs when a compressed core tends to open. As shown in FIGS. 12A and 12B, when several compressed cores are layered together, first fastening portion 131 and wing portion 135 of fastening member 130 resists the springing effect of the compressed cores to form a relatively strong compressive bond between the flatten cores. Advantageously, core board product 7 is formed with an improved fastening arrangement that prevents tears in large paper rolls during rail transport operations by not separating apart.

Figure 14:
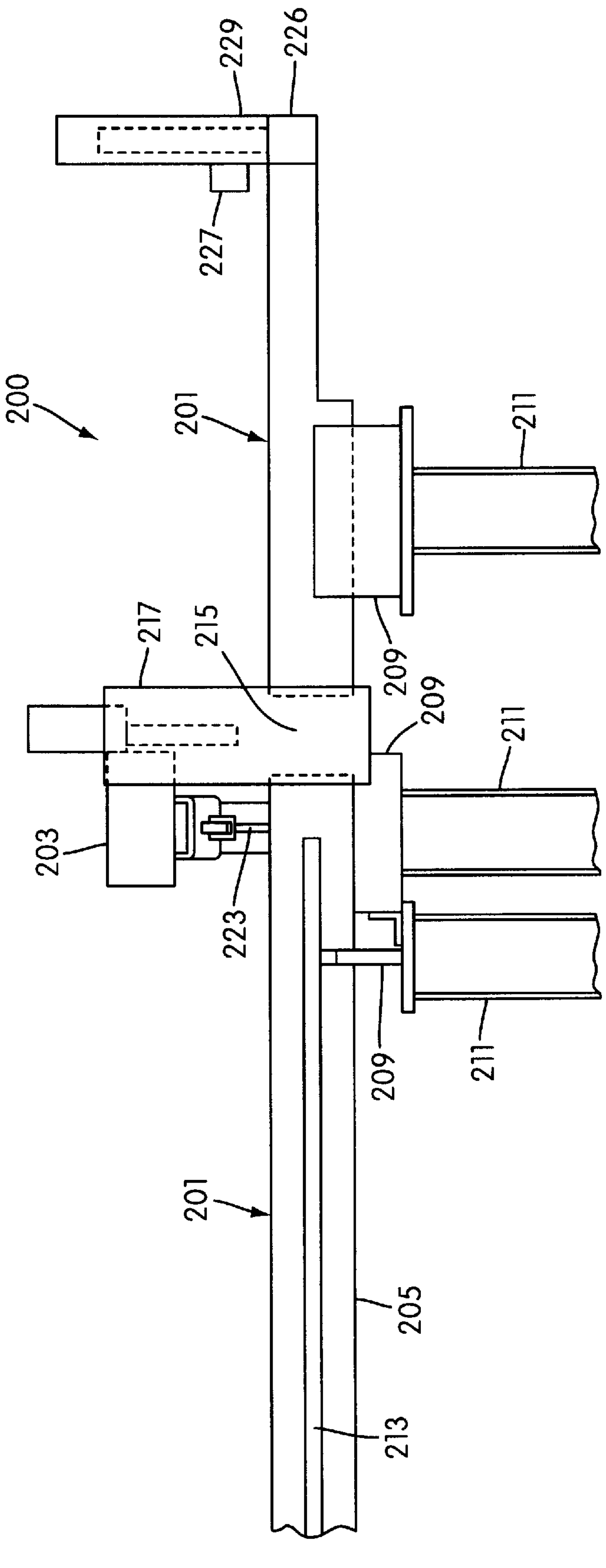
FIG. 14 is a schematic side elevational view of an embodiment of a core cutting apparatus.
Figure 15:
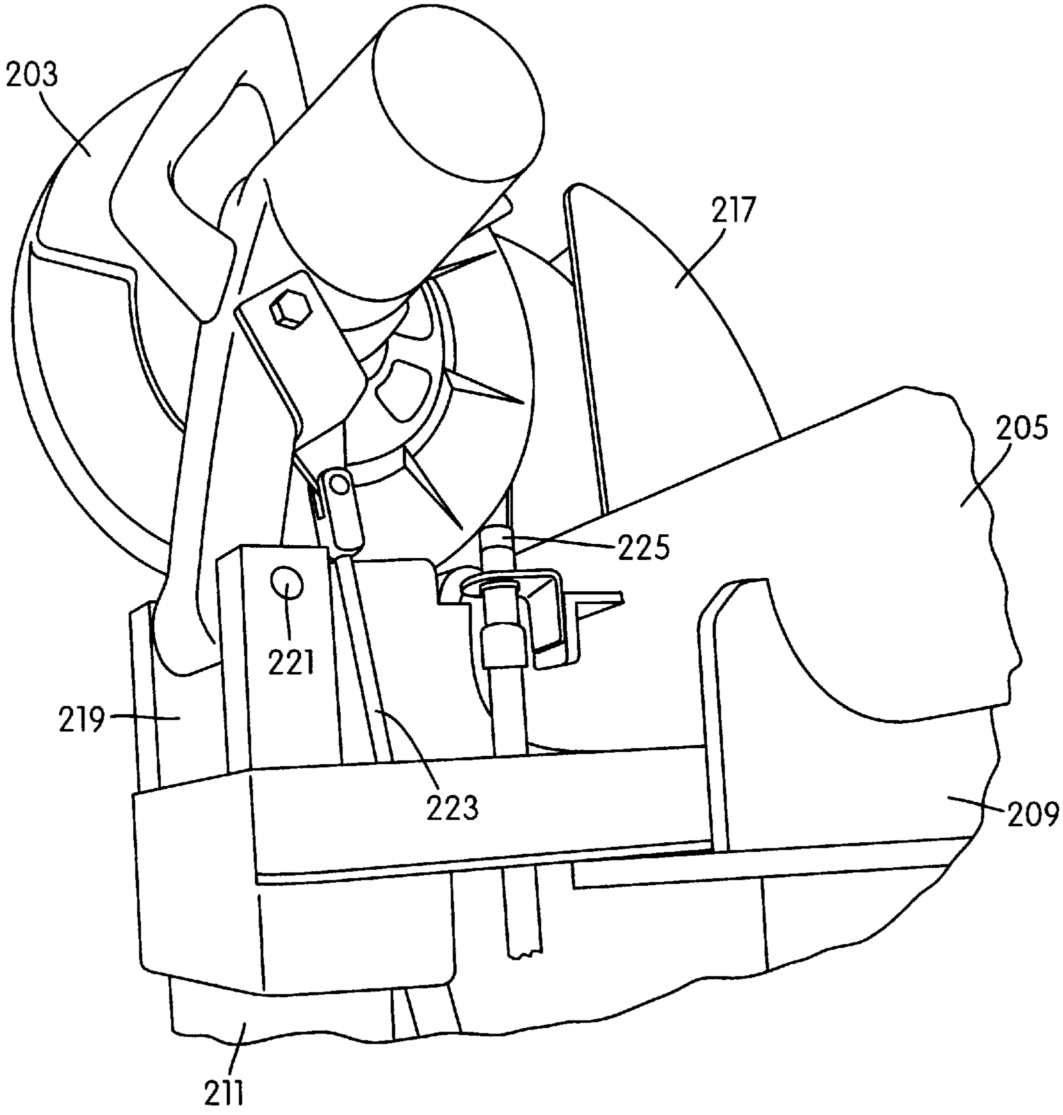
FIG. 15 is a fragmentary perspective view of a cutting device of the apparatus of FIG. 14.

Referring to FIGS. 14–15, if desired, the tubular cores may be cut into smaller sections by a semi-automated core cutting apparatus 200. Control devices described in connection with core cutting apparatus 200 can be operatively coupled to microprocessor controller 9 or a separate controller unit. Referring to FIG. 14, in an embodiment, the core cutting apparatus may comprises an elongated tubular core guide 201 attached to a pivotal circular saw 203 for cutting a core into a smaller core section. Core guide 201 is constructed from a horizontally aligned forward tube 205, and a rear tube 207 with both having an inside diameter sized to accommodate one core. Tubes 205, 207 are horizontally supported by support members 209 mounted on top of vertically disposed beam members 211. Tubes 205, 207 can be constructed from steel pipes. Tubes 205, 207 are fastened to support member 209 and beam members 211 by welding or other methods. The wall of forward tube 205 includes a slot opening 213 along its length so that an operator can slide an elongated core inside of the tube. Rear tube 207 has a predetermined length so that elongated cores are cut into a corresponding length.

Referring to FIG. 14, a gap 215 is formed between forward tube 205 and rear tube 207 so that saw 203 is enabled to cut and separate of the core. A saw blade cover 217 is welded to both tubes 205, 207 on opposite sides of gap 215. Referring to FIG. 15, saw 203 is pivotally mounted to a support 219 by a pivot pin 221. Saw 203 is also mounted a pneumatic actuator that is mounted so that upward and downward movement of a rod 223 of the actuator pivots saw 203 about pin 221. A saw proximity sensor 225 detects when saw 203 has pivoted into a downward position. Saw proximity sensor 225 is mounted in a vertical position to detect when a magnetic field is formed in a short distance at its sensing end. If desired, sensor 225 may be a mechanical switch, or optical sensor to detect position of the saw.

Referring to FIG. 14, the top portion of discharge end 226 of rear tube 207 preferably includes an opening for an optical sensor 227 to detect the presence of the leading end of the core in tube 207. Near optical sensor 227 at discharge end 226, an air cylinder 229 is mounted in which its rod extends downward to block the movement of the core upon detection of the core leading end by sensor 227. Referring to FIG. 15, in use, upon detection of core leading end, the rod 223 moves downward to the blade of saw 203 activates. During downward rotation of saw 203, the saw blade separates the core. Saw proximity sensor 225 detects the end of the rotation and saw 203 is pivot back by rod 223. While not shown, another proximity sensor detects when the saw in the up position.

A core clamping arrangement is provided at front end of tube 205 prior to gap 215. The clamping arrangement includes an air cylinder (not shown) attached to a curved clamp (not shown) and return springs (not shown). In use, upon detection of the core leading end by sensor 227, the rod on air cylinder extends downward and forces the curved clamp on the core against the inner surface of tube 205. As a result, the core is prevented from rotating while being cut by saw 203. The return springs moved the clamp back up with the rod of the air cylinder after the core is cut by the saw.

Thus, a core board forming apparatus 1 has been described for producing core board product. Apparatus 1 is capable of producing a core board product about every 15 seconds while in operation. The substantially precision operation of apparatus 1 reduces errors and enables a consistent board product without significant variations in product quality.

While the present invention has been described with reference to exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed, but that the invention will include all embodiments falling within the scope of the appended claims.

What is claimed is:

1. A method of making a core board product, comprising the steps of:

providing an apparatus comprising a conveying portion, a compression member and a flattening surface;

a) dispensing a first tubular core to the conveying portion to support the first tubular core at an interim location;

b) conveying the first tubular core to a flattening position under pressure of the compression member;

c) substantially compressing the first tubular core between the compression member and the flattening surface;

d) repeating steps a) through b) for at least a second tubular core;

e) substantially compressing the second tubular core against the first tubular core; and f) fastening the substantially compressed first tubular core and second tubular core together in an abutting relationship with a plurality of fastening members so as to form the core board product.

2. The method of claim 1, wherein said steps a) through f) are carried out under the control of a control processor.

3. The method of claim 1, wherein said fastening step further comprises fastening each of said fastening members so that a first fastening portion abuts against at least one of the flattened tubular cores, and a second fastening portions are substantially perpendicular to the first fastening portion, said second fastening portions extend through the flattened first tubular core and the flattened second tubular core.

4. The method of claim 3, wherein the fastening step further comprises a step of fastening at least one of the fastening members so that a third fastening portion abuts to flattened second tubular core opposite of to flattened first tubular core abutted by the first fastening portion.

5. The method of claim 1, further comprising the step of ejecting said core board product from to flattening space.

6. The method of claim 1, wherein the conveying portion further comprises a plurality of members configured to contact discrete locations along the tubular core.

7. The method of claim 1, wherein during step b) the conveying portion releases to tubular core on the flattening surface.

8. The method of claim 1, wherein step a) further comprises the step of detecting the first tubular core at a predetermined dispensing position.

9. A computer readable medium configured to operate an apparatus including a conveying portion, a compression member and a flattening surface, the computer readable medium having computer-executable instructions for performing steps comprising:

a) dispensing a first tubular core to the conveying portion to support the first tubular core at an interim location;

b) conveying the first tubular core to a flattening position under pressure of the compression member;

c) substantially compressing the first tubular core between the compression member and the flattening surface;

d) repeating steps a) through b) for at least a second tubular core;

e) substantially compressing the second tubular core against the first tubular core; and f) fastening the substantially compressed first tubular core and second tubular core together in an abutting relationship with a plurality of fastening members so as to form the core board product.

10. The computer readable medium of claim 9, further comprising the step of signaling a device to eject the core board product from the flattening surface.

11. The computer readable medium of claim 9, wherein step a) further comprises the step of generating a core request signal to discharge said first tubular core.

12. A method of making a core board product, comprising the steps of:

providing an apparatus comprising a conveying portion, a compression member and a flattening surface;

a) dispensing a first tubular core to the conveying portion to support the first tubular core;

b) conveying the first tubular core to a flattening position under pressure of the compression member;

c) substantially compressing the first tubular core between the compression member and the flattening surface;

d) repeating steps a) through b) for at least a second tubular core;

e) substantially compressing the second tubular core against the first tubular core; and f) joining the substantially compressed first tubular core and second tubular core together in an abutting relationship with a plurality of staples so as to form the core board product.

13. The method of claim 12, wherein said steps a) through f) are carried out under the control of a processing unit.

14. The method of claim 12, further comprising the step of ejecting said core board product from the flattening surface.

15. The method of claim 12, wherein the conveying portion further comprises a plurality of members configured to contact discrete locations along the tubular core.

16. The method of claim 12, wherein during step b) the conveying portion releases the tubular core on the flattening surface.

17. The method of claim 12, wherein step a) further comprises the step of detecting the first tubular core at a predetermined dispensing position.

* * * * *

UNITED STATES PATENT AND TRADEMARK OFFICE

CERTIFICATE OF CORRECTION

PATENT NO. : 6,785,947 B2 
DATED : September 7, 2004
INVENTOR(S) : Curtis William Downey et al.

It is certified that error appears in the above-identified patent and that said Letters Patent is hereby corrected as shown below:

Column 3,
Line 50, please replace "section above" to -- section 5 above --

Column 11,
Line 60, please replace "to" with -- the --
Line 64, please replace "to" with -- the --

Signed and Sealed this

Eighteenth Day of January, 2005

JON W. DUDAS
*Director of the United States Patent and Trademark Office*